United States Patent
Kim et al.

(10) Patent No.: US 9,692,486 B2
(45) Date of Patent: Jun. 27, 2017

(54) SYSTEM FOR WIRELESS POWER TRANSMISSION AND RECEPTION

(75) Inventors: Nam Yun Kim, Seoul (KR); Sang Wook Kwon, Seongnam-si (KR); Young Tack Hong, Seongnam-si (KR); Dong Zo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 13/214,006

(22) Filed: Aug. 19, 2011

(65) Prior Publication Data

US 2012/0231731 A1    Sep. 13, 2012

(30) Foreign Application Priority Data

Mar. 8, 2011    (KR) .................. 10-2011-0020403

(51) Int. Cl.
  *H04B 7/00*  (2006.01)
  *H04B 5/00*  (2006.01)
  *H02J 5/00*  (2016.01)

(52) U.S. Cl.
  CPC ............ *H04B 5/0037* (2013.01); *H02J 5/005* (2013.01)

(58) Field of Classification Search
  CPC ...... H04B 5/00; H04B 5/0025; H04B 5/0075; H04B 5/0037; H04B 5/0043; H04B 7/00; H02J 5/005
  USPC ............... 455/41.1, 41.2, 157; 45/41.1, 41.2
  See application file for complete search history.

(56) References Cited

U.S. PATENT DOCUMENTS

| | | | | |
|---|---|---|---|---|
| 2009/0271048 A1* | 10/2009 | Wakamatsu | ............ | H02J 17/00 700/296 |
| 2009/0281678 A1* | 11/2009 | Wakamatsu | ............ | H02J 17/00 700/296 |
| 2010/0013322 A1* | 1/2010 | Sogabe et al. | ................ | 307/104 |
| 2010/0036773 A1* | 2/2010 | Bennett | ............................. | 705/67 |
| 2010/0225272 A1* | 9/2010 | Kirby et al. | .................. | 320/108 |
| 2010/0225542 A1* | 9/2010 | Suzuki | ................... | H01Q 1/243 343/700 MS |
| 2010/0227557 A1* | 9/2010 | Won et al. | .................... | 455/41.2 |
| 2010/0248622 A1* | 9/2010 | Lyell Kirby et al. | ........ | 455/41.1 |
| 2010/0295506 A1* | 11/2010 | Ichikawa | ....................... | 320/108 |
| 2011/0196544 A1* | 8/2011 | Baarman et al. | ............. | 700/291 |
| 2011/0221388 A1* | 9/2011 | Low et al. | .................... | 320/108 |

FOREIGN PATENT DOCUMENTS

| | | |
|---|---|---|
| JP | 2001-309580 | 11/2001 |
| JP | 2005-006459 | 1/2005 |
| JP | 2010-141966 | 6/2010 |
| KR | 1020090131748 | 12/2009 |

\* cited by examiner

*Primary Examiner* — Xin Jia
(74) *Attorney, Agent, or Firm* — NSIP Law

(57) ABSTRACT

A wireless power transmitter and receiver, and related methods are provided. In one embodiment, a wireless power receiver may include: a receiving unit configured to receive wireless power from a source resonator; a detecting unit configured to detect a current value, a voltage value, or both of the wireless power; a controller configured to determine whether the detected current value, the detected voltage value, or both have a peak value, in a relation to a load which the wireless power is to be transmitted to; and a communication unit configured to transmit a result of the determination to the source resonator.

11 Claims, 16 Drawing Sheets

FIG. 2
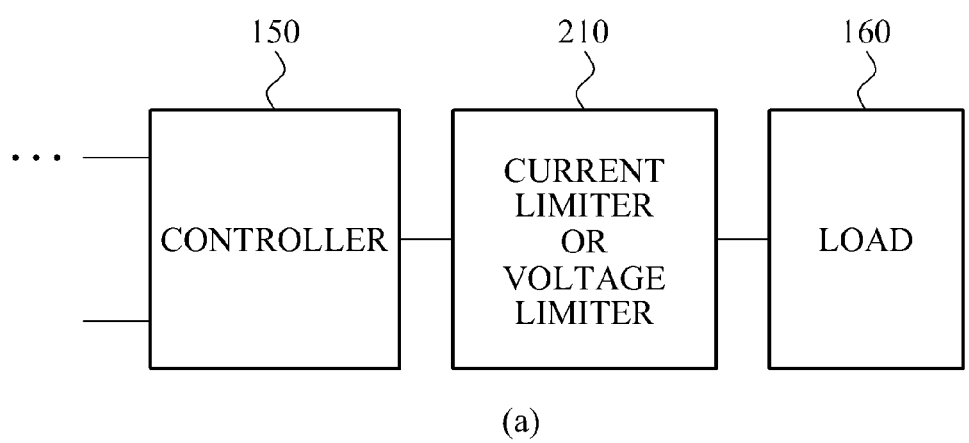
(a)
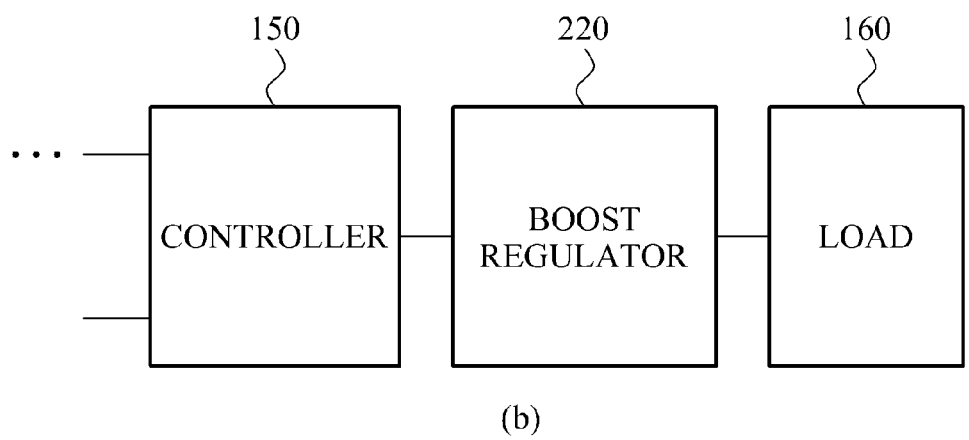
(b)

FIG. 5
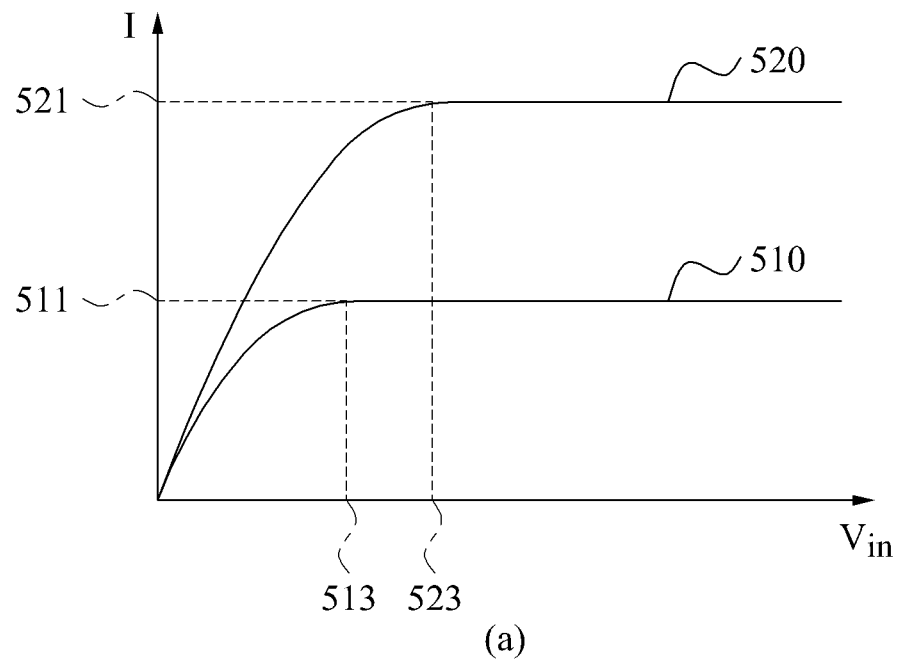
(a)
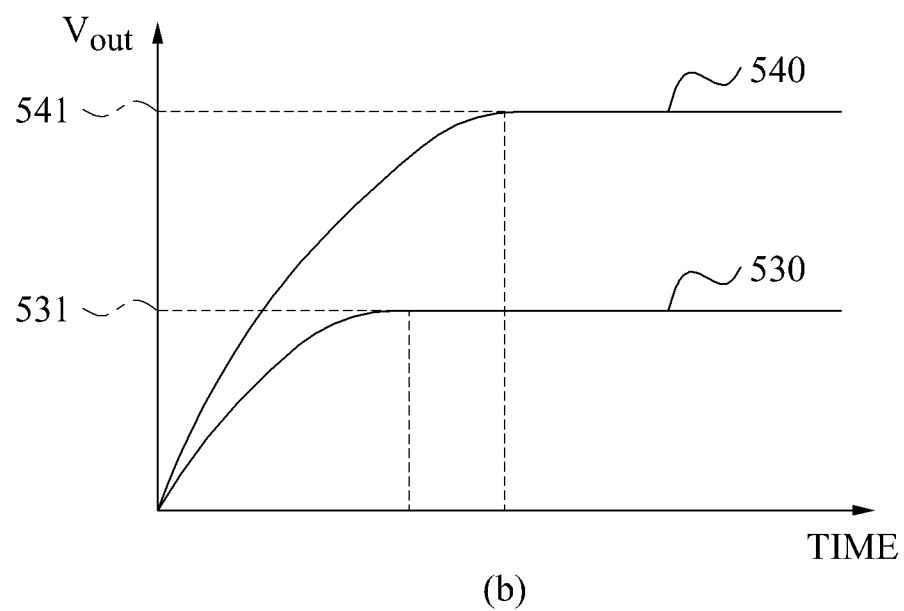
(b)

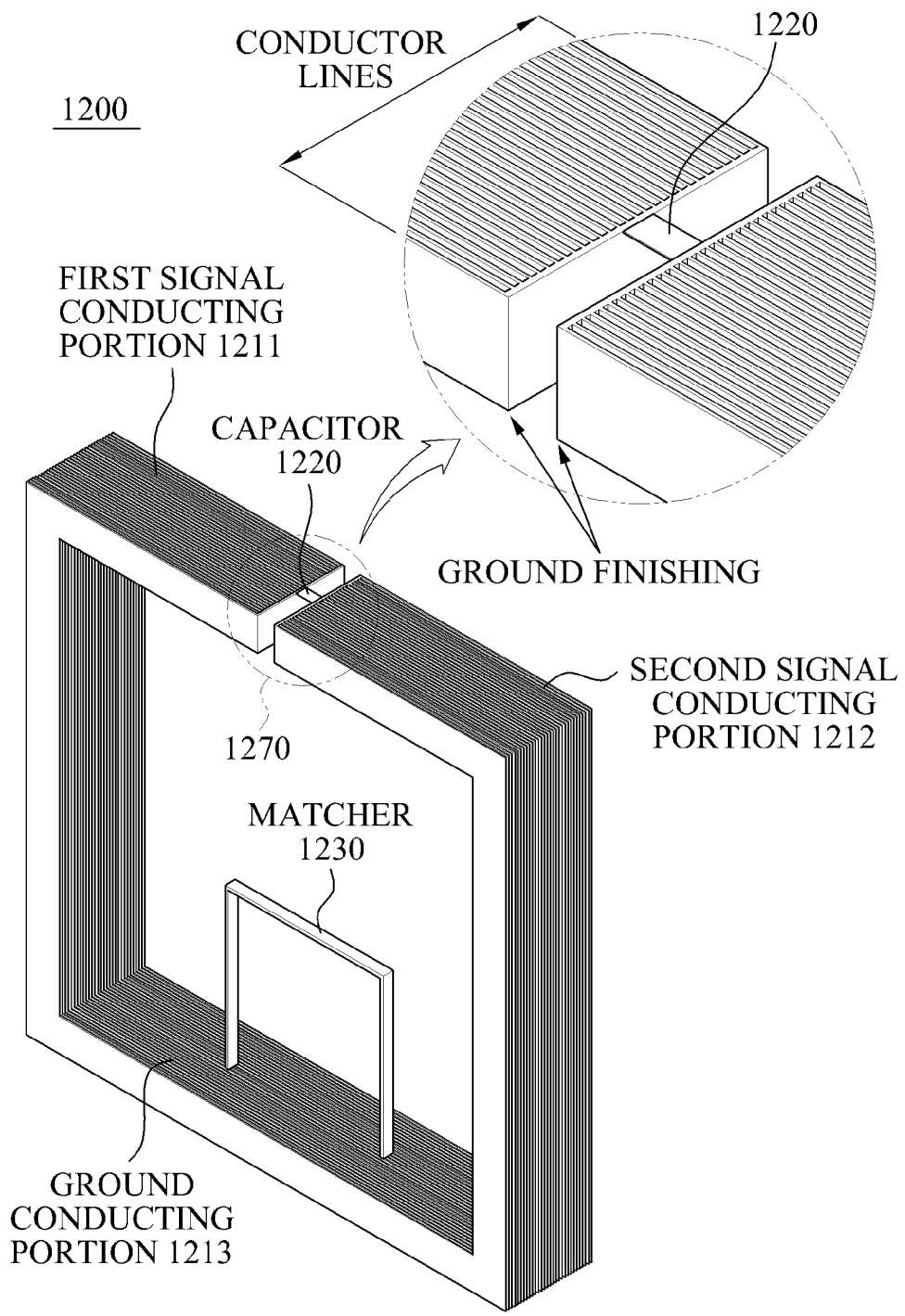

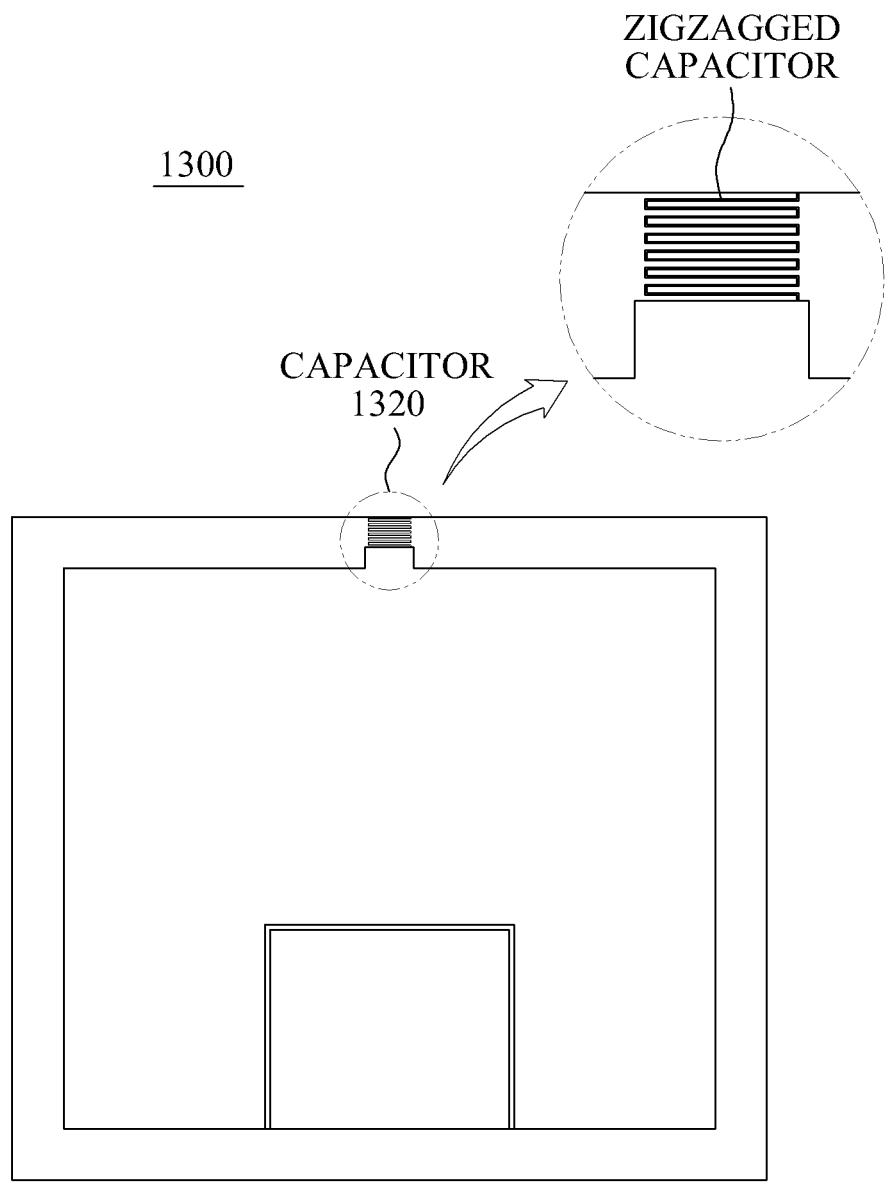

SYSTEM FOR WIRELESS POWER TRANSMISSION AND RECEPTION

CROSS-REFERENCE TO RELATED APPLICATION(S)

This application claims the benefit under 35 U.S.C. §119(a) of Korean Patent Application No. 10-2011-0020403, filed on Mar. 8, 2011, in the Korean Intellectual Property Office, the entire disclosure of which is incorporated herein by reference for all purposes.

BACKGROUND

1. Field

The following description relates to a wireless power transmission and reception.

2. Description of Related Art

As demand for portable electrical devices has rapidly increased, use of wired power supplies for these devices has become more inconvenient. Studies on wireless power transmission have been conducted to overcome inconveniences of wired power supplies and the limited capacity of conventional batteries. One conventional wireless power transmission technology uses a resonance characteristic of radio frequency (RF) device that may include a source that supplies power and a target that receives power.

SUMMARY

According to one general aspect, a wireless power receiver may include: a receiving unit configured to receive wireless power from a source resonator; a detecting unit configured to detect a current value, a voltage value, or both of the wireless power; a controller configured to determine whether the detected current value, the detected voltage value, or both have a peak value, in a relation to a load which the wireless power is to be transmitted to; and a communication unit configured to transmit a result of the determination to the source resonator.

The wireless power receiver may further include: a rectifying unit configured to convert the wireless power from an alternating current (AC) signal to a direct current (DC) signal.

The receiving unit may be configured to receive a wake-up signal from the source resonator, and the detecting unit is configured to detect one or more terminals that are awakened by the wake-up signal, identification information of the awakened terminal, whether the awakened terminal requests charging, or a combination thereof.

The communication unit may include: an in-band communication unit configured to perform in-band communication between the source resonator and a target resonator; and an out-band communication unit to perform out-band communication with a wireless power transmitter, using another communication device.

The communication unit may be configured to transmit, to a wireless power transmitter, a value of the received wireless power as information for tracking a resonance frequency, an impedance matching frequency of the wireless power transmitter, or a combination thereof.

The wireless power receiver may further include: a limiter configured to limit the detected current value, the detected voltage value, or both to have a value in a predetermined range, in the relation with the load.

The wireless power receiver may further include: a boost regulator configured to boost the detected current value or the detected voltage value to reach a current value or a voltage value requested by the load.

According to another general aspect, a wireless power transmitter may include: a communication unit configured to receive information associated with whether a current value, a voltage value, or both detected by a wireless power receiver has a peak value; a controller configured to track a requested power of a load, based on the information; and a transmitting unit configured to transmit, to a target resonator, a wireless power corresponding to the requested power, between a source resonator and the target resonator.

The communication unit may be configured to receive, through an in-band communication scheme or an out-band communication scheme, a value of a wireless power that is received by the wireless power receiver.

The wireless power transmitter may further include: a reflected power calculator configured to calculate reflected power, based on a value of the wireless power transmitted to the target resonator and the value of the wireless power received by the wireless power receiver; and a matching controller configured to set an impedance matching frequency, a resonance frequency, or both between the source resonator and the target resonator, based on the reflected power.

The controller may include: a power controller configured to control, based on the information, a predetermined operating power that is supplied to a power amplifier; and a detecting unit configured to detect a current value or a voltage value of a signal outputted from the operating power.

The controller may be configured to estimate that power outputted from the operating power corresponds to the requested power, when the current value or the voltage value detected by the wireless power receiver has a peak value.

According to yet another general aspect, a method of receiving a wireless power may include: receiving, from a source resonator, wireless power; detecting a current value, a voltage value, or both of the wireless power; determining whether the detected current value, the detected voltage value, or both have a peak value, in a relation to a load which the wireless power is to be transmitted to; and transmitting a result of the determination to the source resonator.

The method may further include: converting the wireless power from an alternating current (AC) signal to a direct current (DC) signal.

The step of transmitting may include: transmitting, to a wireless power transmitter, a value of the received wireless power as information for tracking a resonance frequency an impedance matching frequency, or both of the wireless power transmitter.

According to a further general aspect, a method of transmitting a wireless power may include: receiving information associated with whether a current value, a voltage value, or both detected by a wireless power receiver has a peak value; tracking a requested power of a load, based on the information; and transmitting, to a target resonator of the wireless power receiver, a wireless power corresponding to the requested power.

The method may further include: transmitting, to the wireless power receiver, an initial wireless power, a wake-up signal, or both.

The step of receiving may include: performing in-band communication between the source resonator and the target resonator; and performing out-band communication with the wireless power transmitter, using another communication device.

The step of receiving may include: receiving a value of a wireless power that is received by the wireless power receiver.

The method may further include: calculating reflected power, based on a value of the wireless power transmitted to the target resonator and the value of the wireless power received by the wireless power receiver; and setting an impedance matching frequency a resonance frequency, or both between the source resonator and the target resonator, based on the reflected power.

Other features and aspects may be apparent from the following detailed description, the drawings, and the claims.

BRIEF DESCRIPTION OF THE DRAWINGS

FIGS. 2A and 2B are diagrams illustrating a wireless power receiver.

FIGS. 5A and 5B are graphs illustrating a wireless power received by a wireless power receiver and a power transmitted from a wireless power transmitter.

FIGS. 8 through 14 are diagrams illustrating various resonators.

Figure 1:
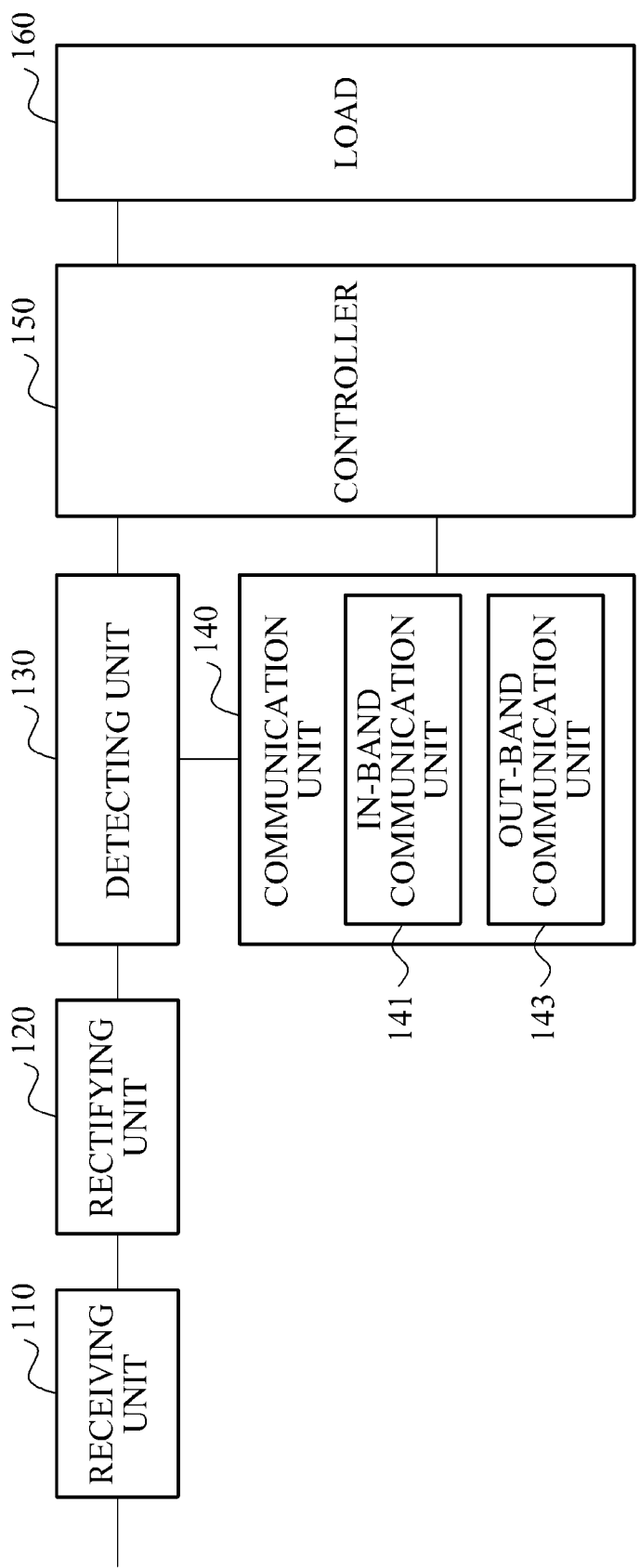
FIG. 1 is a block diagram illustrating a wireless power receiver.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Some conventional wireless power receivers rectify alternating current (AC) voltage of a received wireless power to direct current (DC) voltage, and may further include a DC-DC converter to convert the rectified DC voltage to a rated voltage for a load. For example, the DC-DC converter may correspond to a voltage regulator.

However, when a voltage is less than the voltage for the load is inputted, the DC-DC converter may not operate efficiently. For instance, power may not be provided to the load and thus, wireless power transmission efficiency of the wireless power transmission and reception system may decrease.

According to one or more embodiments, apparatuses and methods are disclosed which share information associated with power requested by the load and a received power, between the wireless power transmitter and the wireless power receiver, through communication, instead of using the DC-DC converter.

FIG. 1 illustrates a wireless power receiver.

The wireless power transmitter may include a source resonator that transmits a wireless power, for example, through a magnetic coupling, and a wireless power receiver may include a target resonator that receives a wireless power.

As shown, the wireless power receiver may include a receiving unit 110, a rectifying unit 120, a detecting unit 130, a communication unit 140, and a controller 150.

The receiving unit 110 may be configured to receive, from the source resonator, a wireless power and a wake-up signal, for instance, using an electromagnetic induction scheme (e.g., a magnetic coupling between the source resonator and the target resonator). The wake-up signal may include a minimum power signal that is used by the target resonator for transmission of data and/or for operating the wireless power receiver.

The data may include information associated with the wireless power received from the source resonator. This may include information associated with the received power, and information associated with a power requested for charging the load 160, such as, for example, information associated with a requested power.

The receiving unit 110 may be configured to receive wireless power from one or more source resonators. In some instances, the wireless power may correspond to the requested power of the load. The wireless power may be calculated by measuring a current and a voltage.

Generally, the wireless power will be alternating current (AC). Thus, the rectifying unit 120 may be configured to convert the wireless power from an AC signal to a DC signal by rectifying the AC signal. The detecting unit 130 may be configured to detect a current value, a voltage value, or both of the wireless power. And the detecting unit 130 may detect a voltage value and/or current value of the rectified DC signal. The detected voltage value and the detected current value may be used for calculating the wireless power received by the wireless power receiver. For instance, the detecting unit 130 may include a current sensor that detects a current value and/or a voltage sensor that detects a voltage value.

In one embodiment, the detecting unit 130 may detect a power transmission efficiency based on a ratio between a wireless power transmitted from a wireless power transmitter and the wireless power received by the wireless power receiver. Information associated with the wireless power transmitted from the wireless power transmitter may be obtained through the communication unit 140.

The detecting unit 130 may detect a number of terminals awakened by the wake-up signal, identification information of the awakened terminal, and whether the awakened terminal request charging. For example, the terminal may correspond to the wireless power receiver or the load 160.

In addition, the detecting unit 130 may be configured to detect environmental information, such as temperature, humidity, or the like around the wireless power receiver.

The communication unit 140 may transmit, to the wireless power transmitter, information associated with the wireless power received by the wireless power receiver. For example, the information associated with the received wireless power may include information associated with whether a wireless power corresponding to the requested power of the load 160 is received. The communication unit 140 may also transmit information whether the current value or the voltage value detected by the detecting unit 130 has a peak value, based on an in-band communication scheme or an out-band communication scheme. The requested power of the load 160 may be detected by the detecting unit 130. In some instances, the requested power of the load 160 may be expressed by a rated voltage of the load 160.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The communication unit 140 may include an in-band communication unit 141 and an out-band communication unit 143. The in-band communication unit 141 may perform in-band communication, for example, through the magnetic coupling between the source resonator and the target resonator. The in-band communication may be transmission and reception of data through the magnetic coupling between the source resonator and the target resonator. And the out-band communication unit 143 may perform out-band communication with the wireless power transmitter using another communication device. The out-band communication may perform transmission and reception of data based on a general communication scheme, using another communication device that is different from the source resonator and the target resonator.

The communication unit 140 may track a resonance frequency, an impedance matching frequency, or both, of the wireless power transmitter, and may transmit a value of the received wireless power to the wireless power transmitter. For example, the value of the received wireless power may denote a voltage value and a current value of the received wireless power. The wireless power transmitter may calculate a reflected power based on the value of the wireless power received by the wireless power receiver. The reflected power may be calculated based on a difference between power transmitted from the wireless power transmitter and power received by the wireless power receiver. The wireless power transmitter may track a resonance frequency and an impedance matching frequency to minimize the reflected power.

In some embodiments, when charging of the load 160 is completed, the communication unit 140 may transmit a charging-completed signal to the wireless power transmitter. In addition, the communication unit 140 may transmit, to the wireless power transmitter, power transmission efficiency detected by the detecting unit 130.

The controller 150 may determine whether the voltage value or the current value detected by the detecting unit 130 has a peak value, in relation to the load 160 to which the wireless power is to be transmitted. Depending on the configuration, the load 160 may be included in the wireless power receiver or may be connected to the wireless power receiver using an external terminal, for instance.

As used herein "peak value" refers to a situation when the wireless power received through the receiving unit 110 is substantially equal to the requested power of the load 160, the current value or the voltage value of the received wireless power. The requested power of the load 160 may be set in the controller 150 in advance or may be detected by the detecting unit 130. Alternatively, the requested power of the load 160 may be changed in a predetermined current range and in a predetermined voltage range, based on the environment or a demand of a user.

When the current value or the voltage value of the received wireless power is less than peak value, the controller 150 may control the communication unit 140 to enable the wireless power transmitter to transmit a higher power.

On the other hand, when the current value or the voltage value of the received wireless power is at, or near, the peak value, the controller 150 may control the communication unit 140 to enable the wireless power transmitter to transmit an equivalent power to a present power. For example, the wireless power transmitter may transmit a constant power based on the requested power of the load 160 and thus, may increase the wireless power transmission efficiency.

The controller 150 may determine whether the detected current value or the detected voltage value has a peak value, for instance, using a constant power transmitted from the wireless power transmitter, until charging of the load 160 is completed.

In one or more embodiments, the source resonator and/or the target resonator may be configured as a helix coil structured resonator, a spiral coil structured resonator, a meta-structured resonator, or the like.

One or more of the materials of the resonator embodiments disclosed herein may be metamaterials. An electromagnetic characteristic of many materials found in nature is that they have a unique magnetic permeability or a unique permittivity. Most materials typically have a positive magnetic permeability or a positive permittivity. Thus, for these materials, a right-hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a given magnetic field in a corresponding material and a magnetic flux density occurring with respect to the given magnetic field in a vacuum state. The permittivity indicates a ratio between an electric flux density occurring with respect to a given electric field in a corresponding material and an electric flux density occurring with respect to the given electric field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area, for instance.

Various source resonators and the target resonators that may be included in the wireless power transmission and reception system will be described below with reference to FIGS. 8 through 14.

FIGS. 2A and 2B illustrate a wireless power receiver. Referring to FIG. 2A, the wireless power receiver may include a current limiter or voltage limiter 210. When the current limiter or voltage limiter 210 is configured as a current limiter, it may limit a current value detected by the detecting unit 130 to have a value in a predetermined range from a requested power of a load. And when a received wireless power that exceeds the predetermined range from the requested power of the load is transmitted to the load, the load may be damaged.

On the other hand, when the current limiter or voltage limiter 210 is configured as a voltage limiter, it may limit a voltage value detected by the detecting unit 130 to have a value in a predetermined range from the load. When a received wireless power that exceeds the predetermined range from the requested power of the load is transmitted to the load, the load may be damaged. In some instances, the current limiter or voltage limiter 210 may perform both current and voltage limiting functions.

Referring to FIG. 2B, the wireless power receiver may include a boost regulator 220. The boost regulator 220 may be configured to boost the current value, the voltage value, or both, detected by the detecting unit 130 so as to reach a current value or a voltage value of a requested power of the load. For example, if the detected voltage value is 3V and the voltage value of the requested power is 5V, the boost regulator 220 may boost 3V to 5V.

Figure 3:
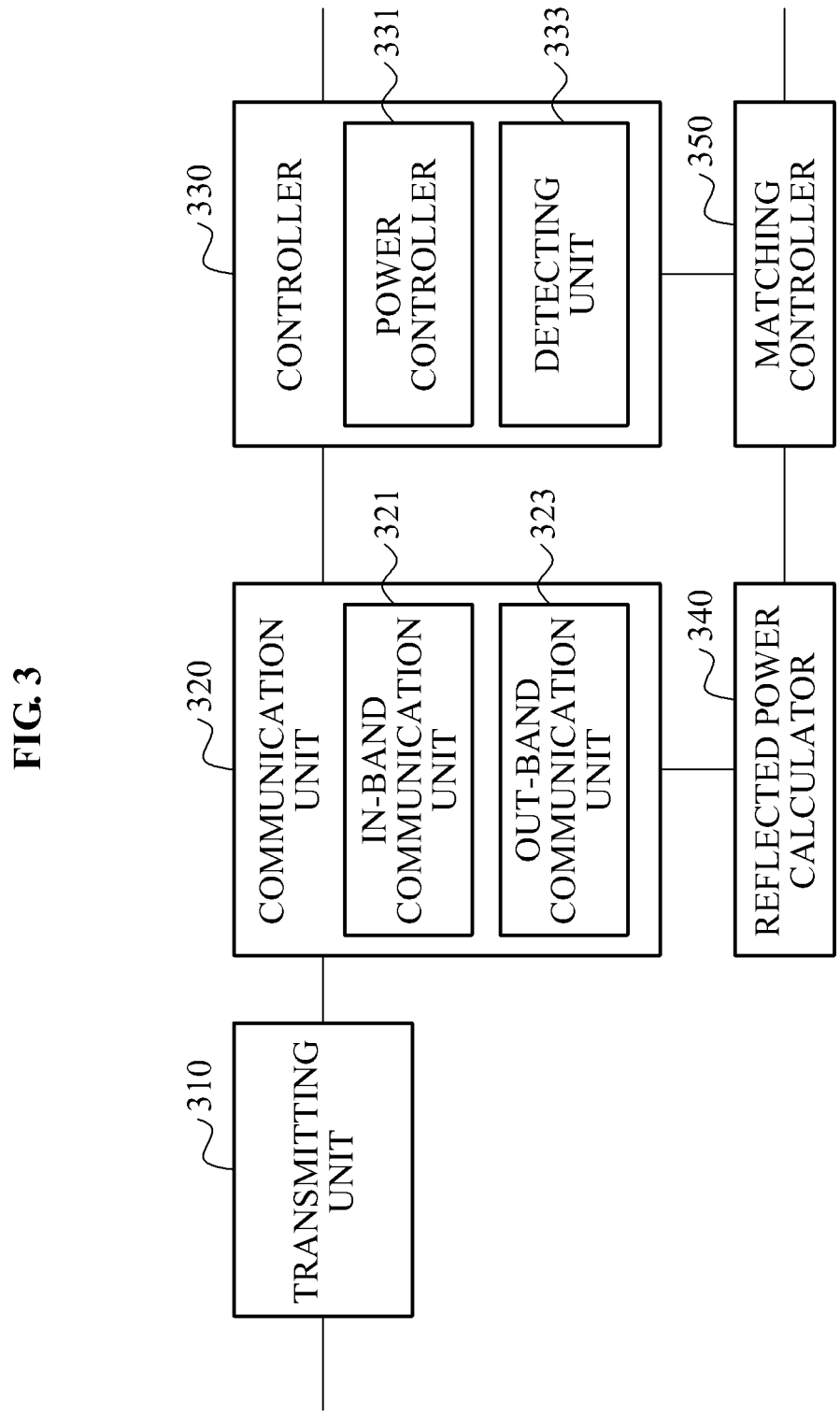
FIG. 3 is a block diagram illustrating a wireless power transmitter.

FIG. 3 illustrates a wireless power transmitter. As shown, the wireless power transmitter may include a transmitting unit 310, a communication unit 320, a controller 330, a reflected power calculator 340, and a matching controller 350.

The transmitting unit 310 may transmit a wireless power to a target resonator, for instance, through a magnetic coupling between a source resonator and the target resonator. The transmitting unit 310 may be configured to transmit an initial wireless power to track a requested power of a load. And the wireless power receiver may feed back, to the wireless power transmitter, whether a current value or a voltage value of the initial wireless power reaches a peak value. In addition, the wireless power transmitter may track the requested power of the load by repeatedly performing the feedback described in the forgoing.

The transmitting unit 310 may transmit a wake-up signal to one or more target resonators. In some instances, the wake-up signal may be a minimum power signal that is used by the target resonator for data transmission.

The communication unit 320 may receive information associated with whether a current value or a voltage value detected by the wireless power receiver has a peak value, based on an in-band communication scheme or an out-band communication scheme. As mentioned above, when the current value or the voltage value detected by the wireless power receiver has a peak value, a wireless power received by the wireless power receiver may be equal to the requested power of the load. Accordingly, when the current value or the voltage value having a peak value is provided through the communication unit 320, the controller 330 may transmit a wireless power corresponding to the requested power of the load, based on power transmission efficiency. The power transmission efficiency may be detected by a detecting unit 333.

The communication unit 320 may include an in-band communication unit 321 and an out-band communication unit 323. The in-band communication unit 321 may perform in-band communication (e.g., through a magnetic coupling between the source resonator and the target resonator). The out-band communication unit 323 may perform out-band communication with the wireless power receiver using another communication device. Thus, the communication unit 320 may receive a value of the wireless power received by the wireless power receiver based on the in-band communication scheme or the out-band communication scheme.

The controller 330 may track the requested power of the load, for instance, based on the information associated with whether the current value or the voltage value detected by the wireless power receiver has the peak value. And, the controller 330 may determine power to be transmitted from the wireless power transmitter, based on the current value or the voltage value having the peak value and the wireless power transmission efficiency. For example, the determined power may correspond to the requested power of the load. When the power determined by the controller 330 is transmitted from the wireless power transmitter, an amount of power substantially equal to the requested power of the load may be received. Various operations of the controller 330 may be performed through a processor, for instance.

In one embodiment, the controller 330 may include a power controller 331 and the detecting unit 333.

The power controlling unit 331 may control an amount of operating power predetermined to be supplied to a power amplifier, based on the information associated with whether the current value or the voltage value detected by the wireless power receiver has the peak value. For example, the predetermined operating power may be a switching-mode power supply (SMPS).

When the current value or the voltage value detected by the wireless power receiver is not the peak value, the power controller 331 may control an operating power to increase a voltage or a current supplied to the power amplifier. Due to the increased voltage or increased current, a wireless power transmitted from the transmitting unit 310 may increase and thus, power received by the wireless power receiver may increase. The power controlling unit 331 may continue to control the operating power until the current value or the voltage value detected by the wireless power receiver reaches a peak value and thus, may increase the voltage or the current supplied to the power amplifier. A determination of whether the current value or the voltage value detected by the wireless power receiver reaches a peak value, after the wireless power is transmitted, may be provided through the communication unit 320.

The detecting unit 333 may detect a current value or a voltage value of a signal outputted from the operating power. The detected current value or the detected voltage value may be used for calculating an amount of power transmitted from the transmitting unit 310. The detected current value or the detected voltage value may be used for determining whether a voltage or a current is appropriately increased, by the power controller 331, to correspond to the requested power of the load, based on the power transmission efficiency. The detecting unit 333 may be embodied by a current sensor that detects a current value and a voltage sensor that detects a voltage value.

The detecting unit 333 may detect a current value and/or a voltage value of a signal outputted from the power amplifier.

The detecting unit 333 may detect the power transmission efficiency, based on a ratio between the wireless power transmitted from the wireless power transmitter and the wireless power received by the wireless power receiver. Information associated with the wireless power received from the wireless power receiver may be obtained by the communication unit 320.

When the current value or the voltage value detected by the wireless power receiver has a peak value, the controller 330 may estimate that power outputted from an operating power corresponds to the requested power. For example, the power controller 331 may control the operating power based on the voltage value and the current value of the signal outputted from the operating power so that a constant power may be outputted from the transmitting unit 310.

The reflected power calculator 340 may calculate reflected power based on a value of the wireless power transmitted to the target resonator and a value of the wireless power received by the wireless power receiver. The value of the wireless power received by the wireless power receiver may be provided through the communication unit 320. Reflected power may be power that is not received by the wireless power receiver and is reflected among the wireless power transmitted from the wireless power transmitter.

The matching controller 350 may set an impedance matching frequency and a resonance frequency between the source resonator and the target resonator, based on the calculated reflected power. As reflected power increases, the power transmission efficiency decreases. The matching controller 350 may set the resonance frequency and the impedance matching frequency that minimize reflected power.

In some instances, impedance mismatching between the source resonator and the target resonator may occur due to external factors, such as, for example, a change in a distance between the source resonator and the target resonator, a change in a location of the source resonator or the target resonator, and/or the like. It has been found that the impedance mismatching may be a factor that directly decreases the power transmission efficiency.

Thus, the matching controller 350 may sense the reflected power and may determine that the impedance mismatching occurs and thus, may perform the impedance matching. The matching controller 350 may be configured to analyze a waveform of a reflected wave to detect a resonance point and thus, may change the resonance frequency. For example, the matching controller 350 may determine, as the resonance frequency, a frequency having a minimum amplitude in the waveform of the reflected wave.

Figure 4:
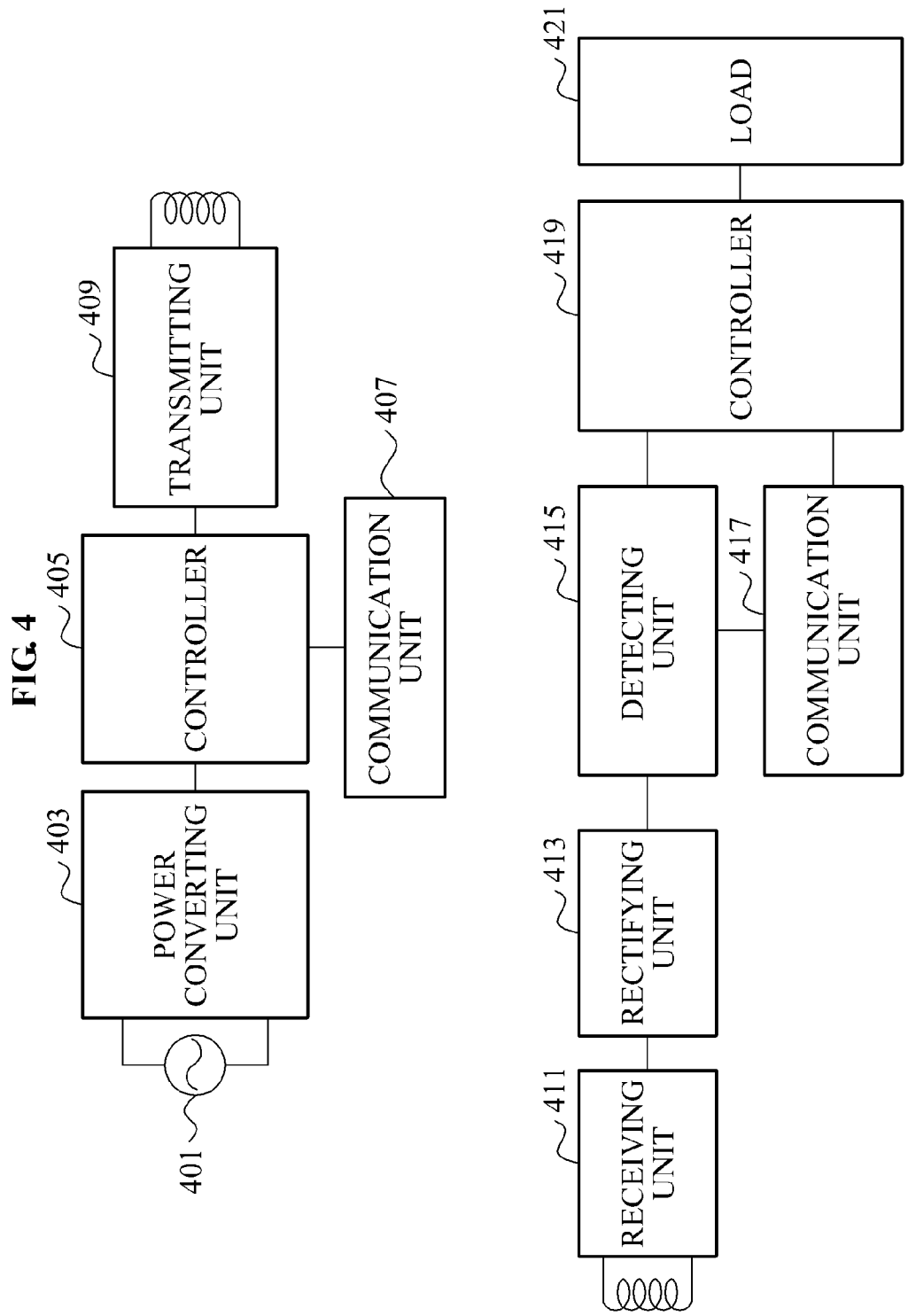
FIG. 4 is a diagram illustrating a wireless power transmission and reception system.

FIG. 4 illustrates a wireless power transmission and reception system. The wireless power transmission and reception system may include a wireless power transmitter and a wireless power receiver.

As shown, the wireless power transmitter may include a power converting unit 403, a controller 405, a communication unit 407, and a transmitting unit 409.

The power converting unit 403 may be configured to receive energy from an external voltage supplier 401, and may generate a wireless power. The power converting unit 403 may include an AC-AC converter, an AC-DC converter, and a DC-AC Inverter. The AC-AC converter may adjust, to a desired level, a signal level of an AC signal inputted from the external voltage supplier 401. The AC-DC converter may output a DC voltage of a predetermined level by rectifying an AC signal outputted from the AC-AC converter. The DC-AC inverter may generate an AC signal (e.g., in a range of a few megahertz (MHz) to several dozen MHz) by quickly switching the DC voltage outputted from the AC-DC converter through an SMPC.

The controller 405 may track a requested power of a load, for instance, based on whether a current value or a voltage value detected by the wireless power receiver has a peak value. The controller 405 may determine power to be transmitted from the wireless power transmitter, based on the current value and/or the voltage value having the peak value and the wireless power transmission efficiency. For example, the determined power may correspond to the requested power of the load. When the power determined by the controller 405 is transmitted from the wireless power transmitter, an amount of power substantially equal to the requested power of the load may be received. In one embodiment, the controller 405 may control an SMPC, and may determine the power to be transmitted from the wireless power transmitter. And the controller 405 may detect a voltage value and/or a current value of a signal output from the SMPC or a voltage value and a current value of a signal output from the power amplifier, and may determine whether the detected value corresponds to the requested power of the load.

The communication unit 407 may receive information associated with whether the current value or the voltage value detected by the wireless power receiver has a peak value, based on an in-band communication scheme or an out-band communication scheme. If the current value or the voltage value detected by the wireless power receiver has a peak value, the wireless power received by the wireless power receiver may equal to the requested power of the load.

The transmitting unit 409 may transmit, to a target resonator, a wireless power corresponding to the requested power of the load (e.g., through a magnetic coupling between a source resonator and the target resonator). In some instances, the transmitting unit 409 may transmit an initial wireless power to track the requested power of the load.

The wireless power receiver may include a receiving unit 411, a rectifying unit 413, a detecting unit 415, a communication unit 417, and a controller 419.

The receiving unit 411 may receive the wireless power and a wake-up signal from the source resonator through the magnetic coupling between the source resonator and the target resonator. The receiving unit 110 may receive the wireless power corresponding to the requested power of the load.

The rectifying unit 413 may convert the wireless power from an AC signal to a DC signal.

The detecting unit 415 may detect a current value or a voltage value of the wireless power. The detecting unit 415 may detect a voltage value of a rectified DC signal. The detecting unit 415 may detect a current value of the rectified DC signal. The detected voltage value and the detected current value may be used for calculating the wireless power received by the wireless power receiver. For instance, the detecting unit 415 may detect a power transmission efficiency based on a ratio between the wireless power transmitted from the wireless power transmitter and the wireless power received by the wireless power receiver.

The communication unit 417 may transmit information associated with whether the current value or the voltage value detected by the detecting unit 415 has a peak value, based on an in-band communication scheme or an out-band communication scheme.

The controller 419 may determine whether the current value or the voltage value detected by the detecting unit 415 has a peak value, in a relation to the load 421 which the wireless power is to be transmitted to. The load 421 may be included in the wireless power receiver or may be connected to the wireless power receiver using an external terminal.

FIGS. 5A and 5B are graphs illustrating a wireless power received by a wireless power receiver and a power transmitted from a wireless power transmitter.

In FIG. 5A, the graph shows a wireless power received by the wireless power receiver when a single load is used and a wireless power received by the wireless power receiver when two loads are used.

Referring to a curve 510, when the single load is used, as a voltage value of the wireless power received by the wireless power receiver increases, a current value increases. A current value 511 having a peak value at a predetermined point 513 may be maintained to be constant. In this example, the voltage value and the current value 511 at the predetermined point 513 may correspond to a requested power of the load. The wireless power receiver may transmit the voltage value and the current value 511 to the wireless power transmitter, based on an in-band communication scheme or an out-band communication scheme. The wireless power transmitter may determine a voltage value and a current value of a wireless power to be transmitted, based on the voltage value and the current value 511, and the power transmission efficiency. Even when the detected current value is not the peak value, the wireless power receiver may transmit the detected current value to the wireless power transmitter. For example, the wireless power transmitter may increase the voltage value and the current value of the wireless power to be transmitted.

Referring to a curve 520, when two loads are used, as a voltage value of the wireless power received by the wireless power receiver increases, a current value increases. Since the requested power of the load increases, a current value 521 having a peak value at a predetermined point 523 may be greater than the current value 511.

In FIG. 5B, the graph shows a wireless power transmitted from the wireless power transmitter when a single load is used and a wireless power transmitted from the wireless power transmitter when two loads are used.

The wireless power transmitter may transmit, to the wireless power receiver, power in a frequency band of 1 MHz to 20 MHz, to track the resonance impedance and the requested power of the load, for instance.

As mentioned above, the wireless power receiver may transmit, to the wireless power transmitter, information associated with whether a current value and/or a voltage value of the wireless power received by the wireless power receiver, has a peak value. The wireless power transmitter may continue to transmit the wireless power until the current value and the voltage value of the wireless power received by the wireless power receiver reaches the peak value.

Referring to a curve 530, when the single load is used, a voltage value of the wireless power transmitted from the wireless power transmitter increases. When information associated with the current value and the voltage value having the peak value is received from the wireless power receiver, the wireless power transmitter may determine, based on the power transmission efficiency, a voltage value of a wireless power to be transmitted from the wireless power transmitter. For example, the transmitted wireless power may correspond to the requested power of the load, and the wireless power transmitter may transmit a constant wireless power. A voltage value 531 may be a voltage value of the wireless power corresponding to the requested power of the load. Since the constant wireless power is transmitted, the voltage value 531 may be maintained to be constant.

Similarly, referring to a curve 540, when the two loads are used, when information associated with the current value and the voltage value that reaches the peak value are received from the wireless power receiver, a voltage value 541 corresponding to the requested power of the load may be determined.

Figure 6:
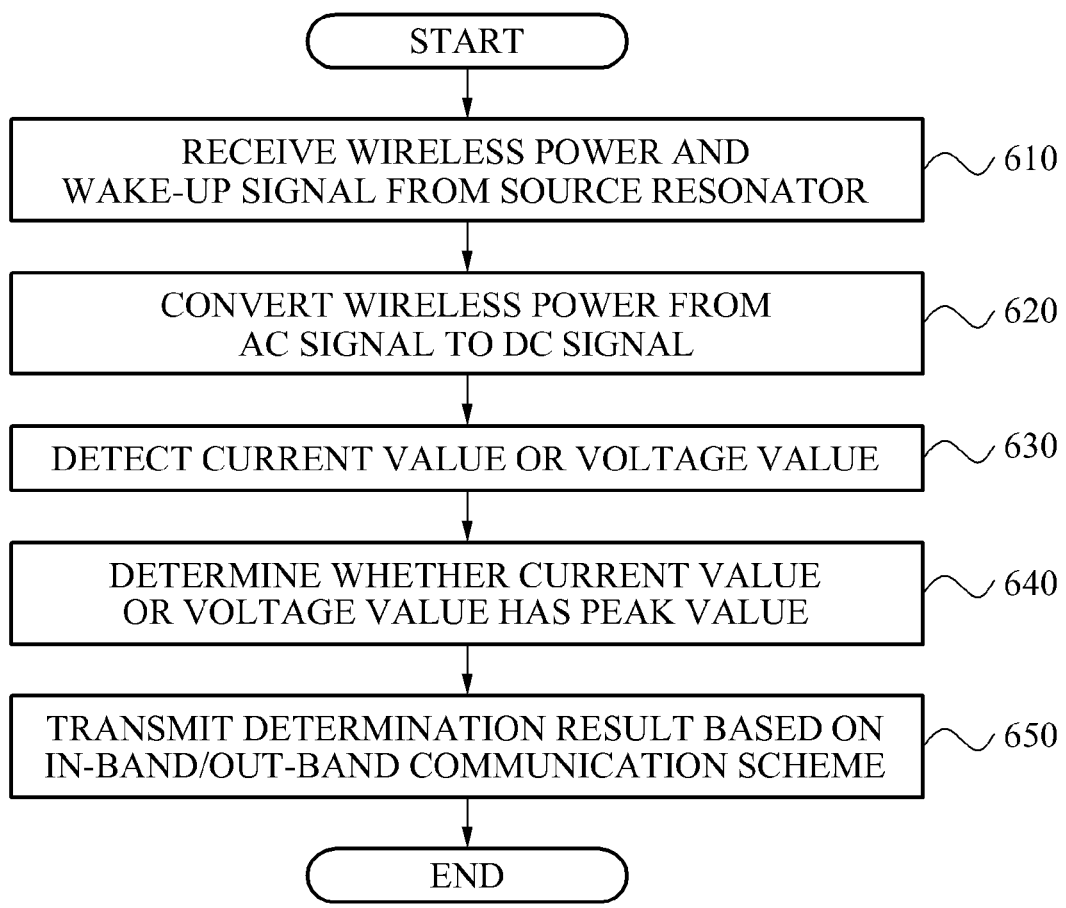
FIG. 6 is a flowchart illustrating a wireless power reception method.

FIG. 6 illustrates a wireless power reception method. In operation 610, a wireless power receiver may receive a wireless power and a wake-up signal from a source resonator. The wireless power may be received by the target resonator based on an electromagnetic induction scheme, such as, through a magnetic coupling in resonance frequency of the source resonator and in resonance frequency of the target resonator. The wireless power may be calculated by measuring a current and a voltage.

In operation 620, the wireless power receiver may convert the received wireless power from an AC signal to a DC signal by rectifying the AC signal.

In operation 630, the wireless power receiver may detect a current value, a voltage value, or both of the DC signal. For example, the wireless power receiver may detect a power transmission efficiency based on a ratio between a wireless power transmitted from a wireless power transmitter and the wireless power received by the wireless power receiver.

In operation 640, the wireless power receiver may determine whether the detected current value or the detected voltage value has a peak value, in a relation to a load which the wireless power is to be transmitted to.

In operation 650, the wireless power receiver may transmit a result of the determination based on an in-band communication scheme or an out-band communication scheme. And the wireless power receiver may transmit, to the wireless power transmitter, information associated with whether the detected current value or the detected voltage value has a peak value.

In addition, the wireless power receiver may transmit a value of the received wireless power to the wireless power transmitter, as information to be used for tracking an impedance matching frequency and a resonance frequency.

Figure 7:
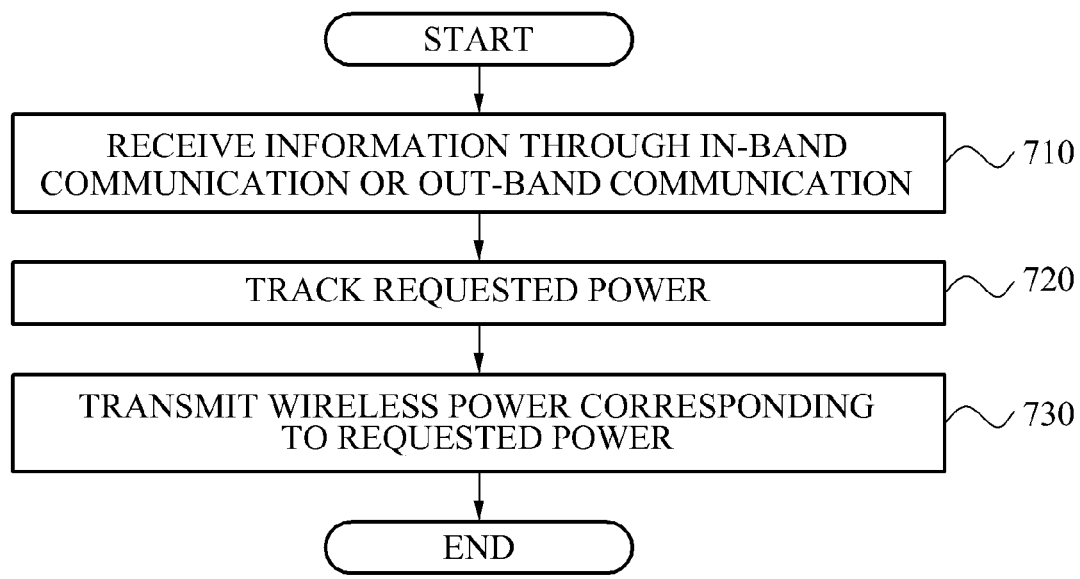
FIG. 7 is a flowchart illustrating a wireless power transmission method.

FIG. 7 illustrates a wireless power transmission method. In operation 710, a wireless power transmitter may receive information associated with whether a current value, a voltage value, or both detected by a wireless power receiver has a peak value, based on an in-band communication scheme or an out-band communication scheme.

The wireless power transmitter may perform in-band communication, for instance, through a magnetic coupling between a source resonator and a target resonator, and may perform out-band communication with the wireless power transmitter using another communication device. Moreover, the wireless power transmitter may receive a value of a wireless power received by the wireless power receiver, based on the in-band communication scheme and the out-band communication scheme.

In operation 720, the wireless power transmitter may track a requested power of a load, based on whether the current value, the voltage value, or both detected by the wireless power receiver has a peak value. The wireless power transmitter may determine power to be transmitted from the wireless power transmitter, based on the current value or the voltage value having a peak value, and wireless power transmission efficiency. For example, the determined power may correspond to the requested power of the load.

In operation 730, the wireless power transmitter may transmit, to the target resonator, a wireless power corresponding to the requested power of the load, for example, through the magnetic coupling between the source resonator and the target resonator.

In some instances, the wireless power transmitter may transmit, to the wireless power receiver, an initial wireless power and a wake-up signal through a magnetic coupling.

And, as discussed above, the wireless power transmitter may calculate reflected power based on a value of a wireless power transmitted from the wireless power transmitter and the value of the wireless power received by the wireless power receiver. The wireless power transmitter may set an impedance matching frequency and a resonance frequency between the source resonator and the target resonator, based on the reflected power.

FIG. 8 through FIG. 14 illustrate various resonators which may be used for wireless power transmission and/or reception.

Figure 8:
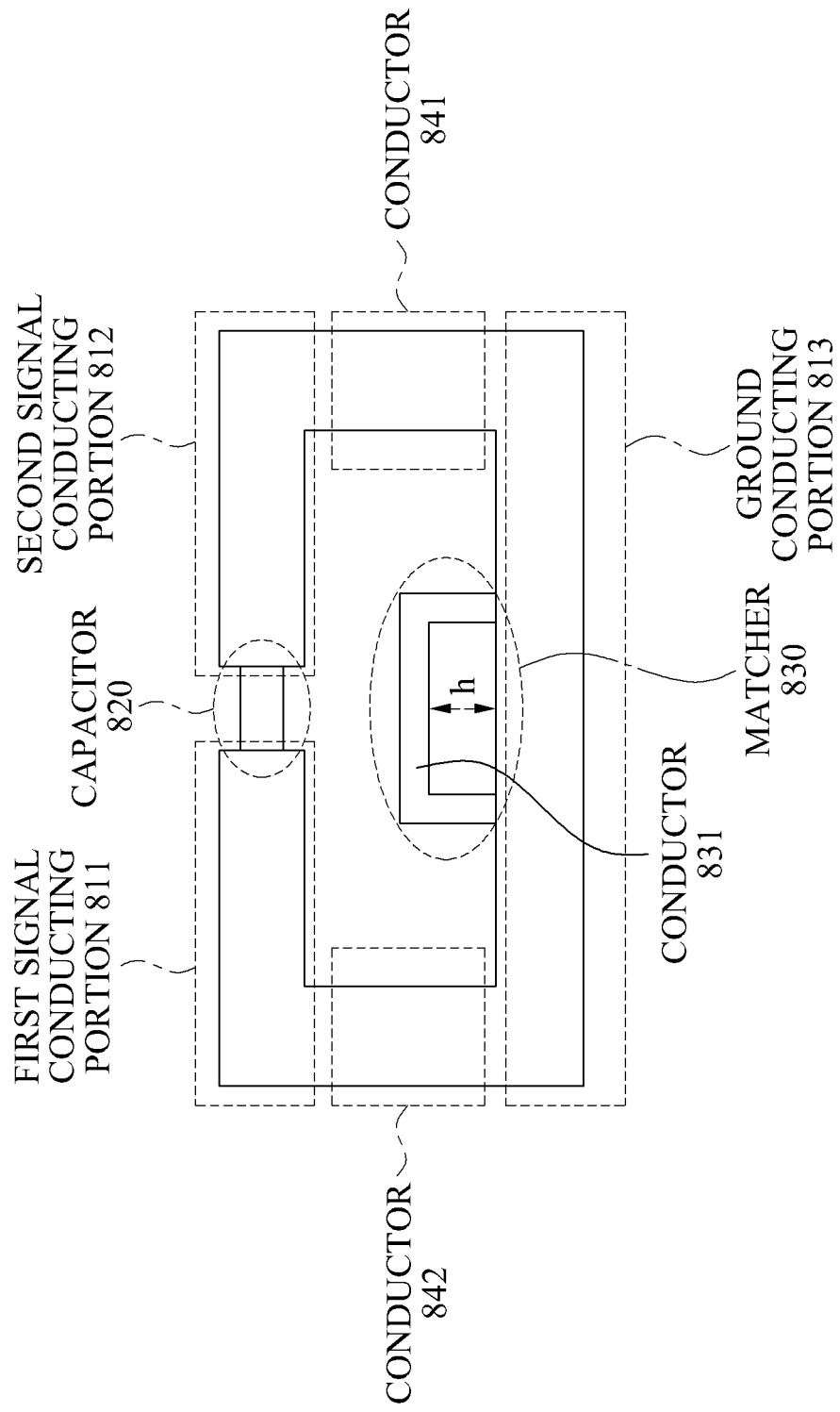

FIG. 8 illustrates a resonator 800 having a two-dimensional (2D) structure. As shown, the resonator 800 having the 2D structure may include a transmission line, a capacitor 820, a matcher 830, and conductors 841 and 842. The transmission line may include, for instance, a first signal conducting portion 811, a second signal conducting portion 812, and a ground conducting portion 813.

The capacitor 820 may be inserted or otherwise positioned in series between the first signal conducting portion 811 and the second signal conducting portion 812 so that an electric field may be confined within the capacitor 820. In various implementations, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded. As shown in FIG. 8, the resonator 800 may be configured to have a generally 2D structure. The transmission line may include the first signal conducting portion 811 and the second signal conducting portion 812 in the upper portion of the transmission line, and may include the ground conducting portion 813 in the lower portion of the transmission line. As shown, the first signal conducting portion 811 and the second signal conducting portion 812 may be disposed to face the ground conducting portion 813 with current flowing through the first signal conducting portion 811 and the second signal conducting portion 812.

In some implementations, one end of the first signal conducting portion 811 may be electrically connected (i.e., shorted) to a conductor 842, and another end of the first signal conducting portion 811 may be connected to the capacitor 820. And one end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 may have an electrically "closed-loop structure." The term "closed-loop structure" as used herein, may include a polygonal structure, for example, a circular structure, a rectangular structure, or the like that is electrically closed. The capacitor 820 may be inserted into an intermediate portion of the transmission line. For example, the capacitor 820 may be inserted into a space between the first signal conducting portion 811 and the second signal conducting portion 812. The capacitor 820 may be configured, in some instances, as a lumped element, a distributed element, or the like. In one implementation, a distributed capacitor may be configured as a distributed element and may include zigzagged conductor lines and a dielectric material having a relatively high permittivity between the zigzagged conductor lines.

When the capacitor 820 is inserted into the transmission line, the resonator 800 may have a property of a metamaterial, as discussed above. For example, the resonator 800 may have a negative magnetic permeability due to the capacitance of the capacitor 820. If so, the resonator 800 may be referred to as a mu negative (MNG) resonator. Various criteria may be applied to determine the capacitance of the capacitor 820. For example, the various criteria for enabling the resonator 800 to have the characteristic of the metamaterial may include one or more of the following: a criterion for enabling the resonator 800 to have a negative magnetic permeability in a target frequency, a criterion for enabling the resonator 800 to have a zeroth order resonance characteristic in the target frequency, or the like.

The resonator 800, also referred to as the MNG resonator 800, may also have a zeroth order resonance characteristic (i.e., having, as a resonance frequency, a frequency when a propagation constant is "0"). If the resonator 800 has a zeroth order resonance characteristic, the resonance frequency may be independent with respect to a physical size of the MNG resonator 800. Moreover, by appropriately designing the capacitor 820, the MNG resonator 800 may sufficiently change the resonance frequency without substantially changing the physical size of the MNG resonator 800 may not be changed.

In a near field, for instance, the electric field may be concentrated on the capacitor 820 inserted into the transmission line. Accordingly, due to the capacitor 820, the magnetic field may become dominant in the near field. In one or more embodiments, the MNG resonator 800 may have a relatively high Q-factor using the capacitor 820 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 800 may include a matcher 830 for impedance-matching. For example, the matcher 830 may be configured to appropriately adjust the strength of a magnetic field of the MNG resonator 800, for instance. Depending on the configuration, current may flow in the MNG resonator 800 via a connector, or may flow out from the MNG resonator 800 via the connector. The connector may be connected to the ground conducting portion 813 or the matcher 830. In some instances, the power may be transferred through coupling without using a physical connection between the connector and the ground conducting portion 813 or the matcher 830.

As shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance-matching positioned in a location that is separate from the ground conducting portion 813 by a distance h. Accordingly, the impedance of the resonator 800 may be changed by adjusting the distance h.

In some instances, a controller may be provided to control the matcher 830 which generates and transmits a control signal to the matcher 830 directing the matcher to change its physical shape so that the impedance of the resonator may be adjusted. For example, the distance h between a conductor 831 of the matcher 830 and the ground conducting portion 813 may be increased or decreased based on the control signal. The controller may generate the control signal based on various factors.

As shown in FIG. 8, the matcher 830 may be configured as a passive element such as the conductor 831, for example. Of course, in other embodiments, the matcher 830 may be configured as an active element such as a diode, a transistor, or the like. If the active element is included in the matcher 830, the active element may be driven based on the control signal generated by the controller, and the impedance of the resonator 800 may be adjusted based on the control signal. For example, when the active element is a diode included in the matcher 830, the impedance of the resonator 800 may be adjusted depending on whether the diode is in an on state or in an off state.

In some instances, a magnetic core may be further provided to pass through the MNG resonator 800. The magnetic core may perform a function of increasing a power transmission distance.

Figure 9:
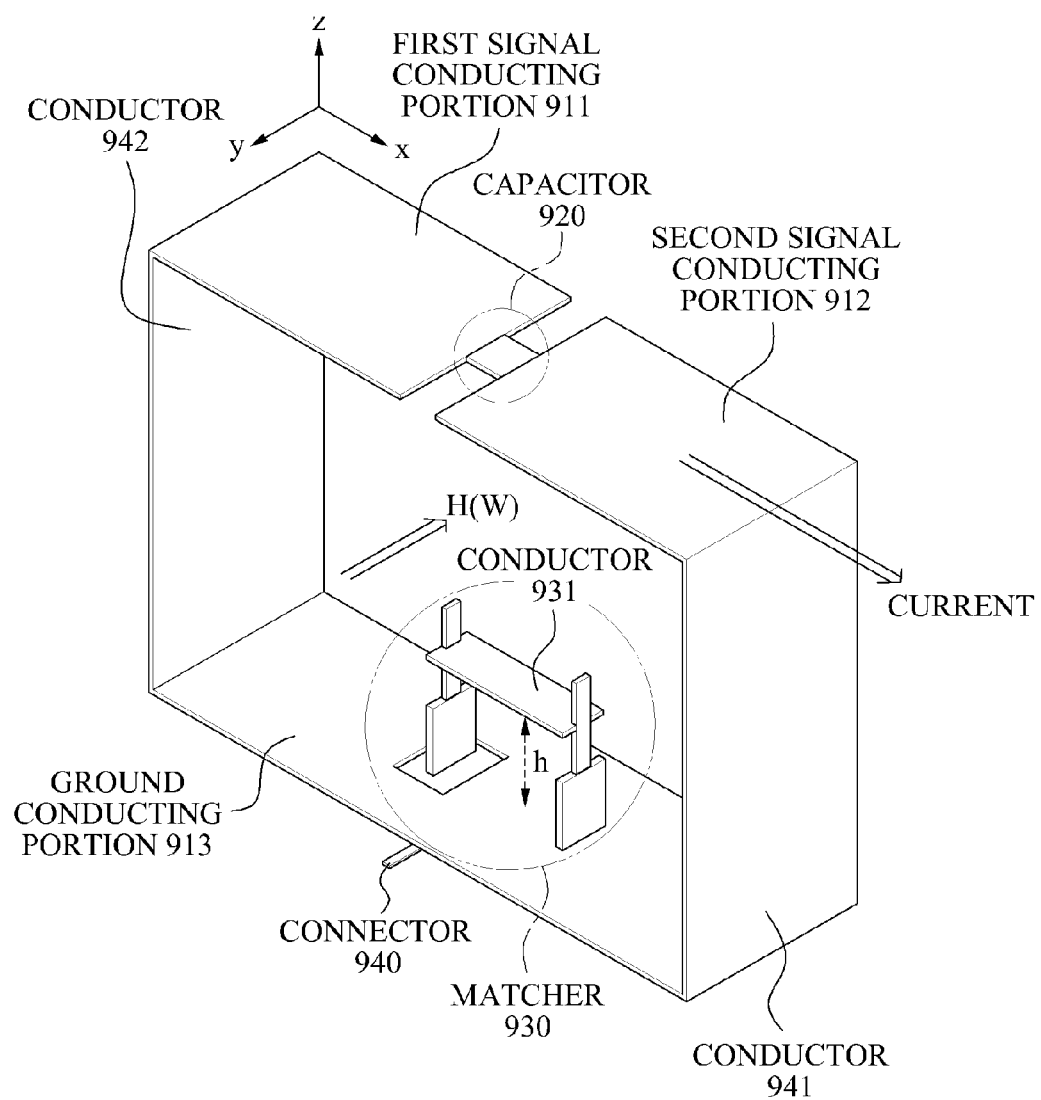

FIG. 9 illustrates a resonator 900 having a three-dimensional (3D) structure. Referring to FIG. 9, the resonator 900 having the 3D structure may include a transmission line and a capacitor 920. The transmission line may include a first signal conducting portion 911, a second signal conducting portion 912, and a ground conducting portion 913. The capacitor 920 may be inserted, for instance, in series between the first signal conducting portion 911 and the second signal conducting portion 912 of the transmission link such that an electric field may be confined within the capacitor 920.

As shown in FIG. 9, the resonator 900 may have a generally 3D structure. The transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may be disposed to face the ground conducting portion 913. In this arrangement, current may flow in an x direction through the first signal conducting portion 911 and the second signal conducting portion 912. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 911 may be electrically connected (i.e., shorted) to a conductor 942, and another end of the first signal conducting portion 911 may be connected to the capacitor 920. One end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically closed-loop structure.

As shown in FIG. 9, the capacitor 920 may be inserted or otherwise positioned between the first signal conducting portion 911 and the second signal conducting portion 912. For example, the capacitor 920 may be inserted into a space between the first signal conducting portion 911 and the second signal conducting portion 912. The capacitor 920 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 920 is inserted into the transmission line, the resonator 900 may have a property of a metamaterial, in some instances, as discussed above.

For example, when a capacitance of the capacitor inserted is a lumped element, the resonator 900 may have the characteristic of the metamaterial. When the resonator 900 has a negative magnetic permeability by appropriately adjusting the capacitance of the capacitor 920, the resonator 900 may also be referred to as an MNG resonator. Various criteria may be applied to determine the capacitance of the capacitor 920. For example, the various criteria may include, for instance, one or more of the following: a criterion for enabling the resonator 900 to have the characteristic of the metamaterial, a criterion for enabling the resonator 900 to have a negative magnetic permeability in a target frequency, a criterion enabling the resonator 900 to have a zeroth order resonance characteristic in the target frequency, or the like. Based on at least one criterion among the aforementioned criteria, the capacitance of the capacitor 920 may be determined.

The resonator 900, also referred to as the MNG resonator 900, may have a zeroth order resonance characteristic (i.e., having, as a resonance frequency, a frequency when a propagation constant is "0"). If the resonator 900 has a zeroth order resonance characteristic, the resonance frequency may be independent with respect to a physical size of the MNG resonator 900. Thus, by appropriately designing the capacitor 920, the MNG resonator 900 may sufficiently change the resonance frequency without substantially changing the physical size of the MNG resonator 900.

Referring to the MNG resonator 900 of FIG. 9, in a near field, the electric field may be concentrated on the capacitor 920 inserted into the transmission line. Accordingly, due to the capacitor 920, the magnetic field may become dominant in the near field. And since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant.

Also, the MNG resonator 900 may include a matcher 930 for impedance-matching. The matcher 930 may be configured to appropriately adjust the strength of magnetic field of the MNG resonator 900. The impedance of the MNG resonator 900 may be determined by the matcher 930. In one or more embodiments, current may flow in the MNG resonator 900 via a connector 940, or may flow out from the MNG resonator 900 via the connector 940. And the connector 940 may be connected to the ground conducting portion 913 or the matcher 930.

As shown in FIG. 9, the matcher 930 may be positioned within the loop formed by the loop structure of the resonator 900. The matcher 930 may be configured to adjust the impedance of the resonator 900 by changing the physical shape of the matcher 930. For example, the matcher 930 may include the conductor 931 for the impedance-matching in a location separate from the ground conducting portion 913 by a distance h. The impedance of the resonator 900 may be changed by adjusting the distance h.

In some implementations, a controller may be provided to control the matcher 930. In this case, the matcher 930 may change the physical shape of the matcher 930 based on a control signal generated by the controller. For example, the distance h between the conductor 931 of the matcher 930 and the ground conducting portion 913 may be increased or decreased based on the control signal. Accordingly, the physical shape of the matcher 930 may be changed such that the impedance of the resonator 900 may be adjusted. The distance h between the conductor 931 of the matcher 930 and the ground conducting portion 913 may be adjusted using a variety of schemes. For example, a plurality of conductors may be included in the matcher 930 and the distance h may be adjusted by adaptively activating one of the conductors. Alternatively or additionally, the distance h may be adjusted by adjusting the physical location of the conductor 931 up and down. The distance h may be controlled based on the control signal of the controller. For instance, the controller may generate the control signal using various factors. As shown in FIG. 9, the matcher 930 may be configured as a passive element such as the conductor 931, for instance. Of course, in other embodiments, the matcher 930 may be configured as an active element such as a diode, a transistor, and the like. When the active element is included in the matcher 930, the active element may be driven based on the control signal generated by the controller, and the impedance of the resonator 900 may be adjusted based on the control signal. For example, if the active element is a diode included in the matcher 930, the impedance of the resonator 900 may be adjusted depending on whether the diode is in an on state or in an off state.

In some implementations, a magnetic core may be further provided to pass through the resonator 900 configured as the MNG resonator. The magnetic core may perform a function of increasing a power transmission distance.

Figure 10:
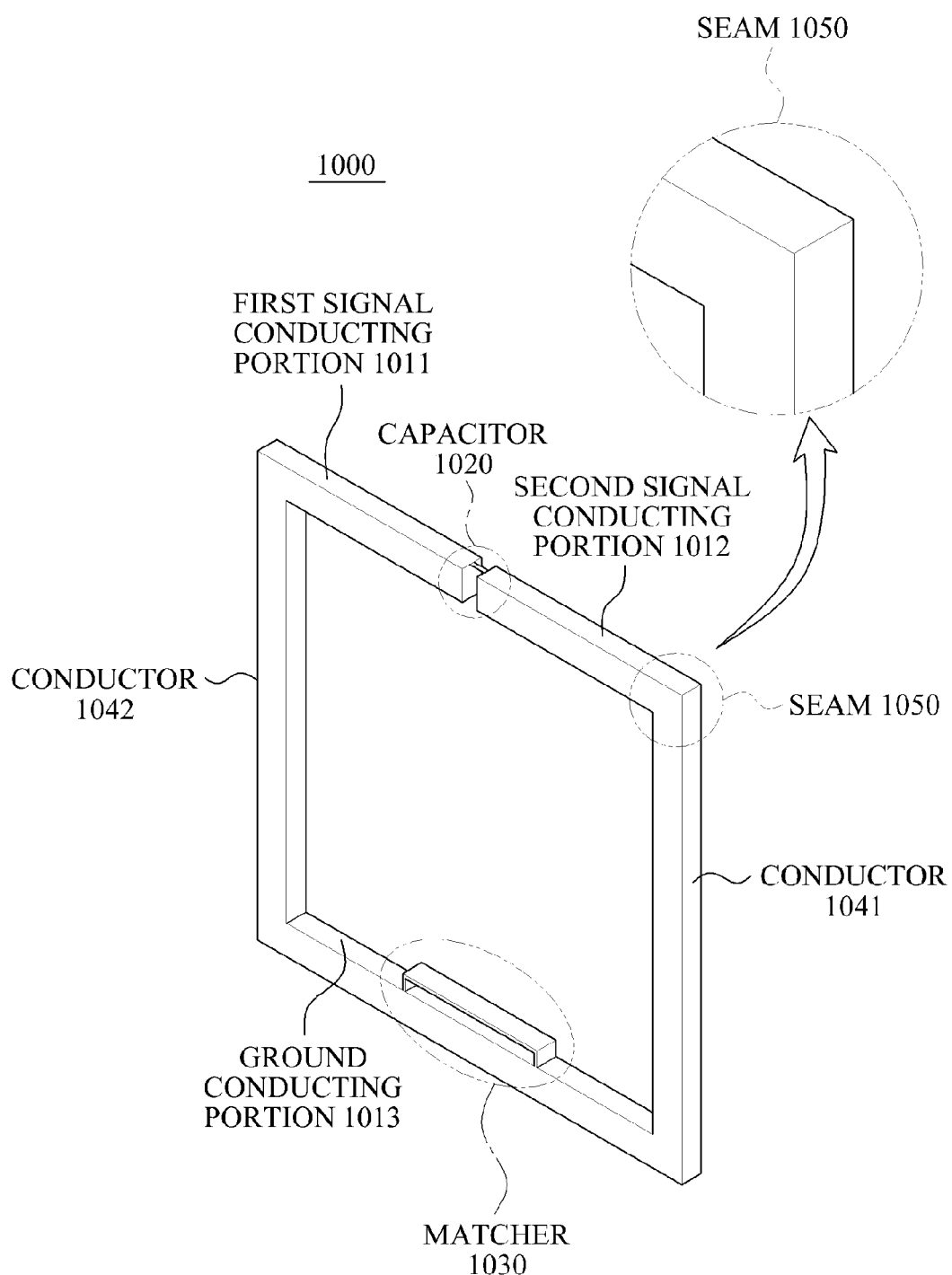

FIG. 10 illustrates a resonator 1000 for a wireless power transmission configured as a bulky type.

As used herein, the term "bulky type" may refer to a seamless connection connecting at least two parts in an integrated form. Referring to FIG. 10, a first signal conducting portion 1011 and a conductor 1042 may be integrally formed instead of being separately manufactured and thereby be connected to each other. Similarly, the second signal conducting portion 1012 and a conductor 1041 may also be integrally manufactured.

When the second signal conducting portion 1012 and the conductor 1041 are separately manufactured and then are connected to each other, a loss of conduction may occur due to a seam 1050. Thus, in some implementations, the second signal conducting portion 1012 and the conductor 1041 may be connected to each other without using a separate seam (i.e., seamlessly connected to each other). Accordingly, it is possible to decrease a conductor loss caused by the seam 1050. For instance, the second signal conducting portion 1012 and a ground conducting portion 1013 may be seamlessly and integrally manufactured. Similarly, the first signal conducting portion 1011, the conductor 1042 and the ground conducting portion 1013 may be seamlessly and integrally manufactured.

Figure 11:
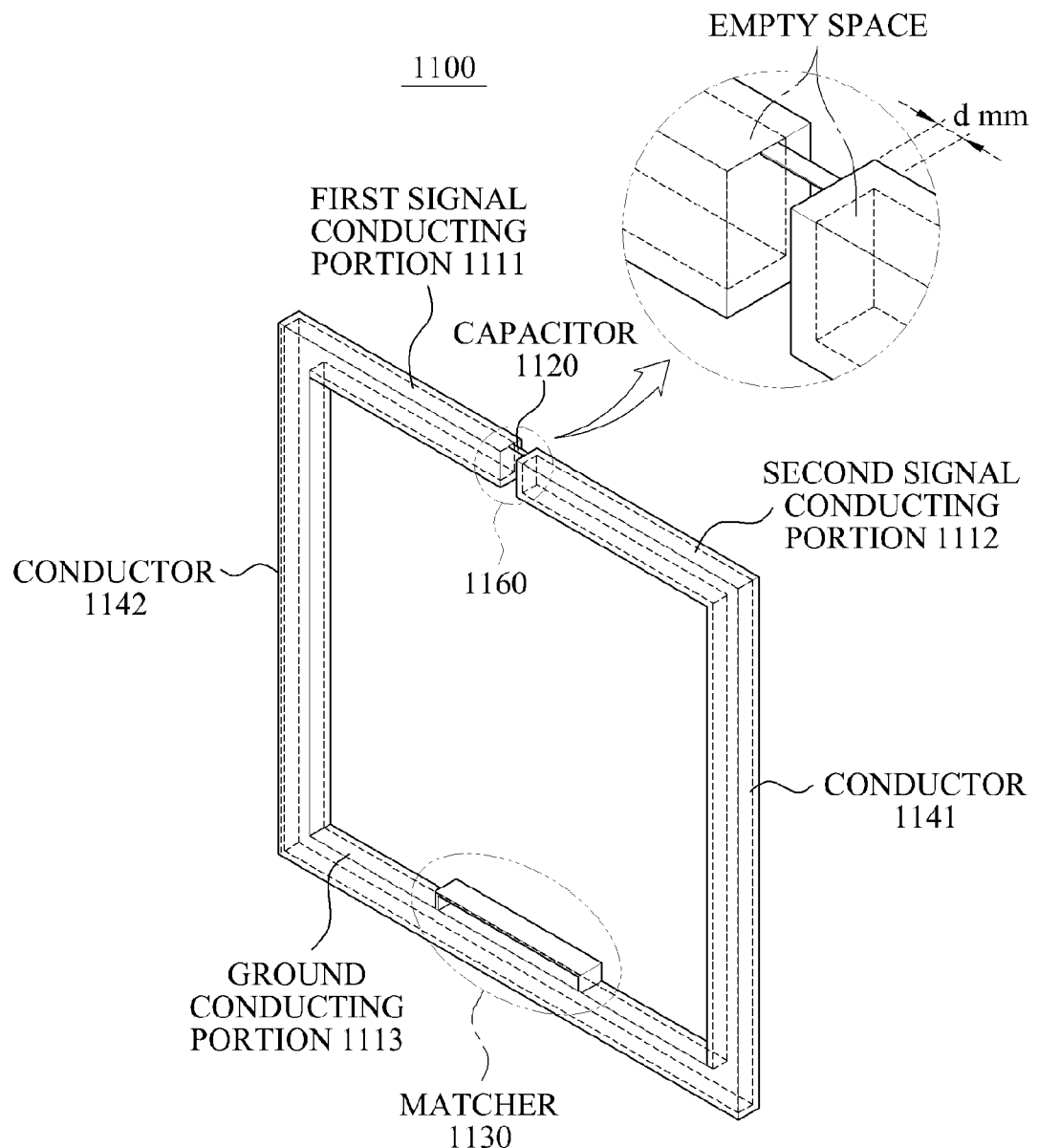

A matcher 1030 may be provided that is similarly constructed as described herein in one or more embodiments. FIG. 11 illustrates a resonator 1100 for a wireless power transmission, configured as a hollow type.

Referring to FIG. 11, each of a first signal conducting portion 1111, a second signal conducting portion 1112, a ground conducting portion 1113, and conductors 1141 and 1142 of the resonator 1100 configured as the hollow type structure. As used herein the term "hollow type" refers to a configuration that may include an empty space inside.

For a given resonance frequency, an active current may be modeled to flow in only a portion of the first signal conducting portion 1111 instead of all of the first signal conducting portion 1111, the second signal conducting portion 1112 instead of all of the second signal conducting portion 1112, the ground conducting portion 1113 instead of all of the ground conducting portion 1113, and the conductors 1141 and 1142 instead of all of the conductors 1141 and 1142. When a depth of each of the first signal conducting portion 1111, the second signal conducting portion 1112, the ground conducting portion 1113, and the conductors 1141 and 1142 is significantly deeper than a corresponding skin depth in the given resonance frequency, it may be ineffective. The significantly deeper depth may, however, increase a weight or manufacturing costs of the resonator 1100, in some instances.

Accordingly, for the given resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. When each of the first signal conducting portion 1111, the second signal conducting portion 1112, the ground conducting portion 1113, and the conductors 1141 and 1142 has an appropriate depth deeper than a corresponding skin depth, the resonator 1100 may become light, and manufacturing costs of the resonator 1100 may also decrease.

For example, as shown in FIG. 11, the depth of the second signal conducting portion 1112 (as further illustrated in the enlarged view region 1160 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 1111, the second signal conducting portion 1112, the ground conducting portion 1113, and the conductors 1141 and 1142 are made of a copper and they may have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

A capacitor 1120 and a matcher 1130 may be provided that are similarly constructed as described herein in one or more embodiments. FIG. 12 illustrates a resonator 1200 for a wireless power transmission using a parallel-sheet.

Referring to FIG. 12, the parallel-sheet may be applicable to each of a first signal conducting portion 1211 and a second signal conducting portion 1212 included in the resonator 1200.

Each of the first signal conducting portion 1211 and the second signal conducting portion 1212 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1211 and the second signal conducting portion 1212, it may be possible to decrease the ohmic loss, and to increase the Q-factor and the coupling effect. Referring to the enlarged view portion 1270 indicated by a circle, when the parallel-sheet is applied, each of the first signal conducting portion 1211 and the second signal conducting portion 1212 may include a plurality of conductor lines. The plurality of conductor lines may be disposed in parallel, and may be electrically connected (i.e., shorted) at an end portion of each of the first signal conducting portion 1211 and the second signal conducting portion 1212.

When the parallel-sheet is applied to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

A capacitor 1220 and a matcher 1230 positioned on the ground conducting portion 1213 may be provided that are similarly constructed as described herein in one or more embodiments. FIG. 13 illustrates a resonator 1300 for a wireless power transmission, including a distributed capacitor.

Referring to FIG. 13, a capacitor 1320 included in the resonator 1300 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1320 as a distributed element, it may be possible to decrease the ESR. As will be appreciated, a loss caused by the ESR may decrease a Q-factor and a coupling effect.

As shown in FIG. 13, the capacitor 1320 may be configured as a conductive line having the zigzagged structure.

As shown in FIG. 13, by employing the capacitor 1320 as the distributed element, it is possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 14A:
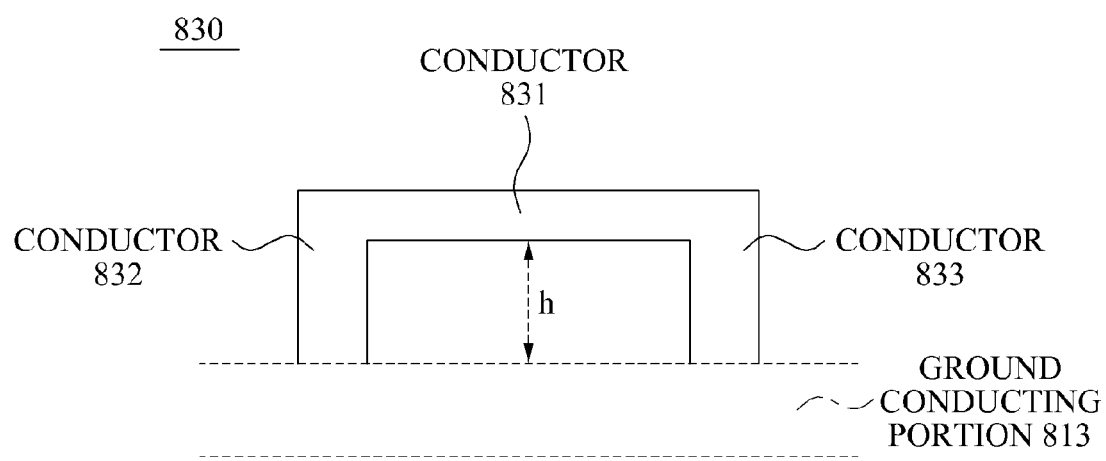
Figure 14B:
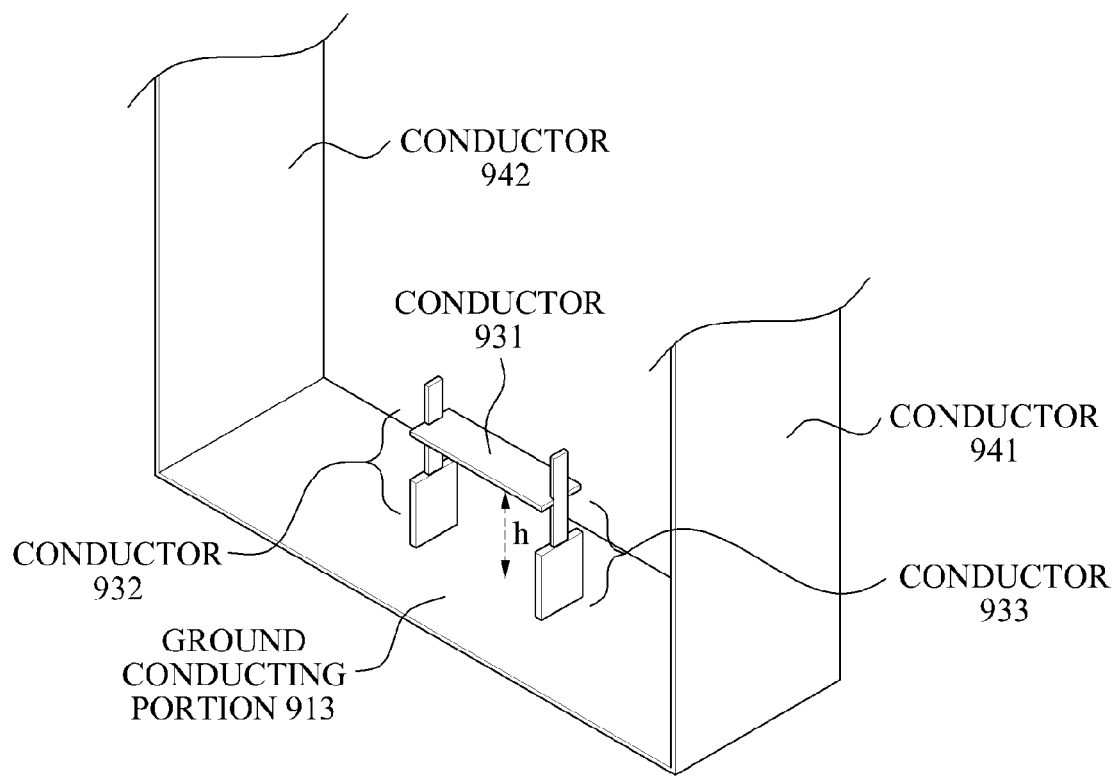

FIG. 14A illustrates one embodiment of the matcher 830 used in the resonator 800 provided in the 2D structure of FIG. 8, and FIG. 14B illustrates an example of the matcher 930 used in the resonator 900 provided in the 3D structure of FIG. 9.

FIG. 14A illustrates a portion of the 2D resonator including the matcher 830, and FIG. 14B illustrates a portion of the 3D resonator of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813. The distance h between the conductor 831 and the ground conducting portion 813 may be controlled by the controller. The distance h between the conductor 831 and the ground conducting portion 813 may be adjusted using a variety of schemes. For example, the variety of schemes may include, for instance, one or more of the following: a scheme of adjusting the distance h by adaptively activating one of the conductors 831, 832, and 833, a scheme of adjusting the physical location of the conductor 831 up and down, and/or the like.

Referring to FIG. 14B, the matcher 930 may include the conductor 931, a conductor 932, a conductor 933 and conductors 941 and 942. Also, the conductors 941 and 942 may be connected to the ground conducting portion 913. The conductors 932 and 933 may be connected to the ground conducting portion 913 and the conductor 931. The impedance of the 3D resonator may be determined based on a distance h between the conductor 931 and the ground conducting portion 913. The distance h between the conductor 931 and the ground conducting portion 913 may be controlled by the controller, for example. Similar to the matcher 830 included in the 2D structured resonator, in the matcher 930 included in the 3D structured resonator, the distance h between the conductor 931 and the ground conducting portion 913 may be adjusted using a variety of schemes. For example, the variety of schemes may include, for instance, one or more of the following: a scheme of adjusting the distance h by adaptively activating one of the conductors 931, 932, and 933, a scheme of adjusting the physical location of the conductor 931 up and down, or the like.

Although not illustrated in FIGS. 14A and 14B, the matcher may include an active element. Thus, a scheme of adjusting an impedance of a resonator using the active element may be similar as described above. For example, the impedance of the resonator may be adjusted by changing a path of a current flowing through the matcher using the active element.

Figure 15:
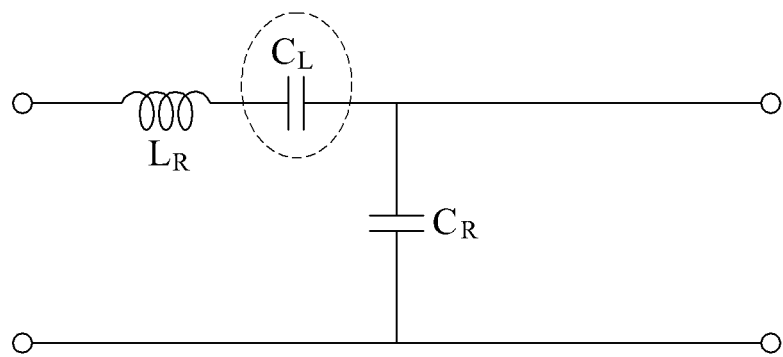
FIG. 15 is a diagram illustrating one equivalent circuit of the resonator for wireless power transmission illustrated in FIG. 8.

FIG. 15 illustrates one equivalent circuit of the resonator 800 for the wireless power transmission of FIG. 8.

The resonator 800 of FIG. 8 for the wireless power transmission may be modeled to the equivalent circuit of FIG. 15. In the equivalent circuit depicted in FIG. 15, $L_R$ denotes an inductance of the power transmission line, $C_L$ denotes a capacitor that is inserted in a form of a lumped element in the middle of the power transmission line, and $C_R$ denotes a capacitance between the power transmissions and/or ground of FIG. 8.

In some instances, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \qquad \text{[Equation 1]}$$

In Equation 1, MZR denotes a Mu zero resonator.

Referring to Equation 1, the resonance frequency $\omega_{MZR}$ of the resonator 800 may be determined by $L_R/C_L$. A physical size of the resonator 800 and the resonance frequency $\omega_{MZR}$ may be independent with respect to each other. Since the physical sizes are independent with respect to each other, the physical size of the resonator 800 may be sufficiently reduced.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power receiver comprising:
 a receiver comprising a target resonator configured to receive wireless power from a source resonator;
 a detector configured to detect a current value, a voltage value, or both of the wireless power and detect a requested power;
 a controller configured to verify whether an amount of the wireless power corresponding to an amount of the requested power of a load is received and to determine whether the detected current value, the detected voltage value, or both have a peak value based on the verification; and
 a communicator configured to transmit a result of the determination to a wireless power transmitter and information associated with whether the amount of the wireless power corresponding to the requested power is received,
 wherein the target resonator comprises:
 a transmission line comprising a first signal conducting portion, a second signal conducting portion, and a first ground conducting portion corresponding to the first signal conducting portion and the second signal conducting portion;
 a first conductor electrically connecting the first signal conducting portion and the first ground conducting portion;
 second conductor electrically connecting the second signal conducting portion and the first ground conducting portion; and
 capacitor inserted between the first signal conducting portion and the second signal conducting portion, in series with respect to a current flowing through the first signal conducting portion and the second signal conducting portion.

2. The wireless power receiver of claim 1, further comprising:
 a rectifier configured to convert the wireless power from an alternating current (AC) signal to a direct current (DC) signal.

3. The wireless power receiver of claim 1, wherein the receiver is configured to receive a wake-up signal from the source resonator, and the detector is configured to detect one or more terminals that are awakened by the wake-up signal, identification information of the awakened terminal, whether the awakened terminal requests charging, or a combination thereof.

4. The wireless power receiver of claim 1, wherein the communicator comprises:
 an in-band communicator configured to perform in-band communication between the source resonator and a target resonator; and
 an out-band communicator configured to perform out-band communication with the wireless power transmitter, using another communication device.

5. The wireless power receiver of claim 1, wherein the communicator is configured to transmit, to the wireless power transmitter, a value of the received wireless power as information for tracking a resonance frequency, an impedance matching frequency of the wireless power transmitter, or a combination thereof.

6. The wireless power receiver of claim 1, further comprising:
 a limiter configured to limit the detected current value, the detected voltage value, or both to have a value in a predetermined range, in the relation with the load.

7. The wireless power receiver of claim 1, further comprising:
 a boost regulator configured to boost the detected current value or the detected voltage value to reach a current value or a voltage value requested by the load.

8. The wireless power receiver of claim 1, wherein the receiver is further configured to receive wireless power corresponding to operation based on the result of the determination used at the wireless power transmitter.

9. A method of receiving a wireless power, the method comprising:
 receiving, from a source resonator, wireless power using a target resonator;

detecting a current value, a voltage value, or both of the wireless power;

detecting a requested power of a load;

verifying whether an amount of the wireless power corresponding to an amount of the requested power of a load is received;

determining whether the detected current value, the detected voltage value, or both have a peak value based on the verifying; and transmitting a result of the determination to a wireless power transmitter and information associated with whether the amount of the wireless power corresponding to the requested power is received, wherein the target resonator comprises:

transmission line comprising a first signal conducting portion, a second signal conducting portion, and a first around conducting portion corresponding to the first signal conducting portion and the second signal conducting portion;

a first conductor electrically connecting the first signal conducting portion and the first ground conducting portion;

a second conductor electrically connecting the second signal conducting portion and the first ground conducting portion; and a capacitor inserted between the first signal conducting portion and the second signal conducting portion, in series with respect to a current flowing through the first signal conducting portion and the second signal conducting portion.

10. The method of claim 9, further comprising:

converting the wireless power from an alternating current (AC) signal to a direct current (DC) signal.

11. The method of claim 9, wherein the step of transmitting comprises:

transmitting, to the wireless power transmitter, a value of the received wireless power as information for tracking a resonance frequency an impedance matching frequency, or both of the wireless power transmitter.

* * * * *